United States Patent [19]

Barg et al.

[11] Patent Number: 5,537,016

[45] Date of Patent: Jul. 16, 1996

[54] METHOD FOR VERIFYING THE PERFORMANCE ACCURACY OF A NUMERICALLY CONTROLLED MACHINE

[75] Inventors: Juergen Barg; Waltraud Witka; Wolfgang Grimm, all of Michelstadt, Germany

[73] Assignee: Robert Bosch GmbH, Stuttgart, Germany

[21] Appl. No.: 212,573

[22] Filed: Mar. 16, 1994

Related U.S. Application Data

[63] Continuation-in-part of PCT/DE93/00841, Sep. 11, 1993.

[30] Foreign Application Priority Data

Sep. 22, 1992 [DE] Germany ............ 42 31 613.8
Jul. 17, 1993 [DE] Germany ............ 43 23 992.7

[51] Int. Cl.$^6$ .................................................. G05B 19/18
[52] U.S. Cl. .................. 318/569; 318/571; 318/570; 318/600
[58] Field of Search ...................... 318/569, 572, 318/574, 600, 570, 575, 571

[56] References Cited

U.S. PATENT DOCUMENTS

| | | | |
|---|---|---|---|
| 4,070,608 | 1/1978 | Rosshirt et al. | 318/572 |
| 4,458,326 | 7/1984 | Kinoshita | 318/569 |
| 4,493,032 | 1/1985 | Johnson | 318/569 |
| 4,754,208 | 6/1988 | Nakajima et al. | 318/574 |
| 5,005,135 | 4/1991 | Morser et al. | 318/569 |

FOREIGN PATENT DOCUMENTS

| | | |
|---|---|---|
| 0000261 | 1/1979 | European Pat. Off. |
| 0182394 | 5/1986 | European Pat. Off. |
| 0258471 | 3/1988 | European Pat. Off. |
| 0429857 | 6/1991 | European Pat. Off. |
| 0510204 | 10/1992 | European Pat. Off. |
| 1133793 | 7/1962 | Germany . |
| 3438007 | 4/1986 | Germany . |
| 3714028 | 11/1988 | Germany . |
| 3908528 | 6/1990 | Germany . |
| 4021603 | 2/1991 | Germany . |
| 4037762 | 7/1991 | Germany . |
| 4111043 | 10/1991 | Germany . |
| 4028006 | 3/1992 | Germany . |
| 4039620 | 6/1992 | Germany . |
| 4200994 | 8/1992 | Germany . |
| 2-13805 | 3/1990 | Japan . |
| 92/09021 | 5/1992 | WIPO . |

OTHER PUBLICATIONS

W. Knapp: "Die Prüfung der Messgerätegenauigkeit mit dem Kreisformtest" In: Technische Rundschau 1985, vol. 42, pp. 12–22, Fig. 5, 7 and 13.

W. Knapp: "Kreisformtest in der praktischen Anwendung auf NC–Werkzeugmaschinen". In: Technische Rundschau 1988 vol. 46, pp. 20, 22, 25, Fig. 2, 4.

E. Kiesel: "Freiprogrammierbares Kompakt–Formmessgerät für rotationssymmetrische Werkstücke". In: Wälzlagertechnik—Industrietechnik (FAG) 1991–502, pp. 29–32.

(List continued on next page.)

Primary Examiner—William M. Shoop, Jr.
Assistant Examiner—Karen Masih
Attorney, Agent, or Firm—Spencer & Frank

[57] ABSTRACT

The invention relates to a method for verifying the performance accuracy of an NC machine by comparing a desired circular path with the actual circular path describing the actual movement of the machine and used in an NC machine having at least two servo control loops each of which is provided with an axis actuator for guiding a carrier in accordance with a position reference signal describing the desired movement path, and a path measuring system to record and feed back the position of the carrier. In this case, the actual circular path $R_M$ is formed from the position signals ($x_M$) supplied by the path measuring system (33, 43) and, preferably, each of the position signals ($x_M$) measured by the path measuring system (33, 43) is compared with the associated position reference signal ($w_{NC}$).

10 Claims, 4 Drawing Sheets

OTHER PUBLICATIONS

W. Knapp et al.: "Der Kreisform–Test zur Prüfung von NC–Werkzeugmaschinen" (The circular–form test for testing NC machine tools), 1986, pp. 19–23.

"Das neue PC–gestützte Messystem zur Überprüfung von Bearbeitungszentren" (The New PC–based Measuring System for Evaluating Processing Centers). 1991, Renishaw Company.

5,537,016

METHOD FOR VERIFYING THE PERFORMANCE ACCURACY OF A NUMERICALLY CONTROLLED MACHINE

CROSS-REFERENCE TO RELATED APPLICATIONS

This application is a continuation-in-part of co-pending international application PCT/DE93/00841 filed Sep. 11, 1993, in which the United States of America have been designated, and claims the priority of German application P 4231613.8 Filed Sep. 22, 1992, and German application P 4323992.7 filed Jul. 17, 1993, all of which applications are incorporated herein by reference.

STATE OF THE ART

The invention relates to a method as defined in the main claim. In order to record the performance accuracy of NC machines the so-called circular-form test was developed. In this testing method a circular path made by the NC machine is compared with a predetermined circular reference path. This method is described, for example, in "Der Kreisform-Test zur Prüfung von NC-Werkzeugmaschinen," [The Circular-Form Test for Testing NC Machine Tools], W. Knapp, S. Hrovat, 1986, Pages 19 to 23. According to this paper, the circular-form test involves the comparison of a circular path, which is traced by an NC machine with a circle that is predetermined by a high-precision reference work tool—the circular normal—having a known diameter. In order to perform this test, the control of the NC Machine is programmed in accordance with a circular path corresponding to the standard circle and is compared with the desired contour of the circular path obtained by a two-dimensional sensor and actually made by the NC machine. The difference is shown graphically and/or numerically. Based on a deviation of the path found in a circular-form test, it is possible to verify the tolerances of the NC machine and also to obtain information on the possible causes for deviations.

A comprehensive illustration on how to evaluate the results obtained with the circular-form test may also be found in the paper by Knapp/Hrovat.

Another principle for performing the circular-form test is known from the brochure by the RENISHAW Company, 1991: "Das neue PC-gestützte Messsystem zur Überprüfung von Bearbeitungszentren," [The New PC-based Measuring System for Evaluating Processing Centers]. In this arrangement, a measuring ruler, which is variable in length, is fastened with one end to the center of a circle to be traced by the machine, and with the other end to the spindle of the machine. The changes in lengths occurring at the measuring ruler while passing the circle are displayed.

One drawback of this prior art method in particular is that it is very time consuming to adjust the mechanical arrangement. This is true especially with respect to the adjustment of the circular normal and of the method according to Knapp/Hrovat. Although the method according to RENISHAW may be performed faster, its measuring system itself includes two joints which may be an additional source of error and therefore jeopardize accuracy.

SUMMARY OF THE INVENTION

It is the object of the present invention, to provide a circular-form test, which, with respect to its results may be performed faster and simpler than the methods described above.

This object is attained by a method having the characteristics as defined in the main claim. The method according to the invention has the advantage that an additional external measuring device is not required. It is both simple and fast and thus may be performed as desired.

In one particular modification the method according to the invention is carried out to complement one of the above methods. In this manner an especially precise analysis of the machine performance accuracy may be obtained.

BRIEF DESCRIPTION OF THE DRAWINGS

An embodiment of the method according to the invention is elucidated in the following specification by way of the drawing.

Drawings

DETAILED DESCRIPTION OF THE PREFERRED EMBODIMENTS

Figure 2:
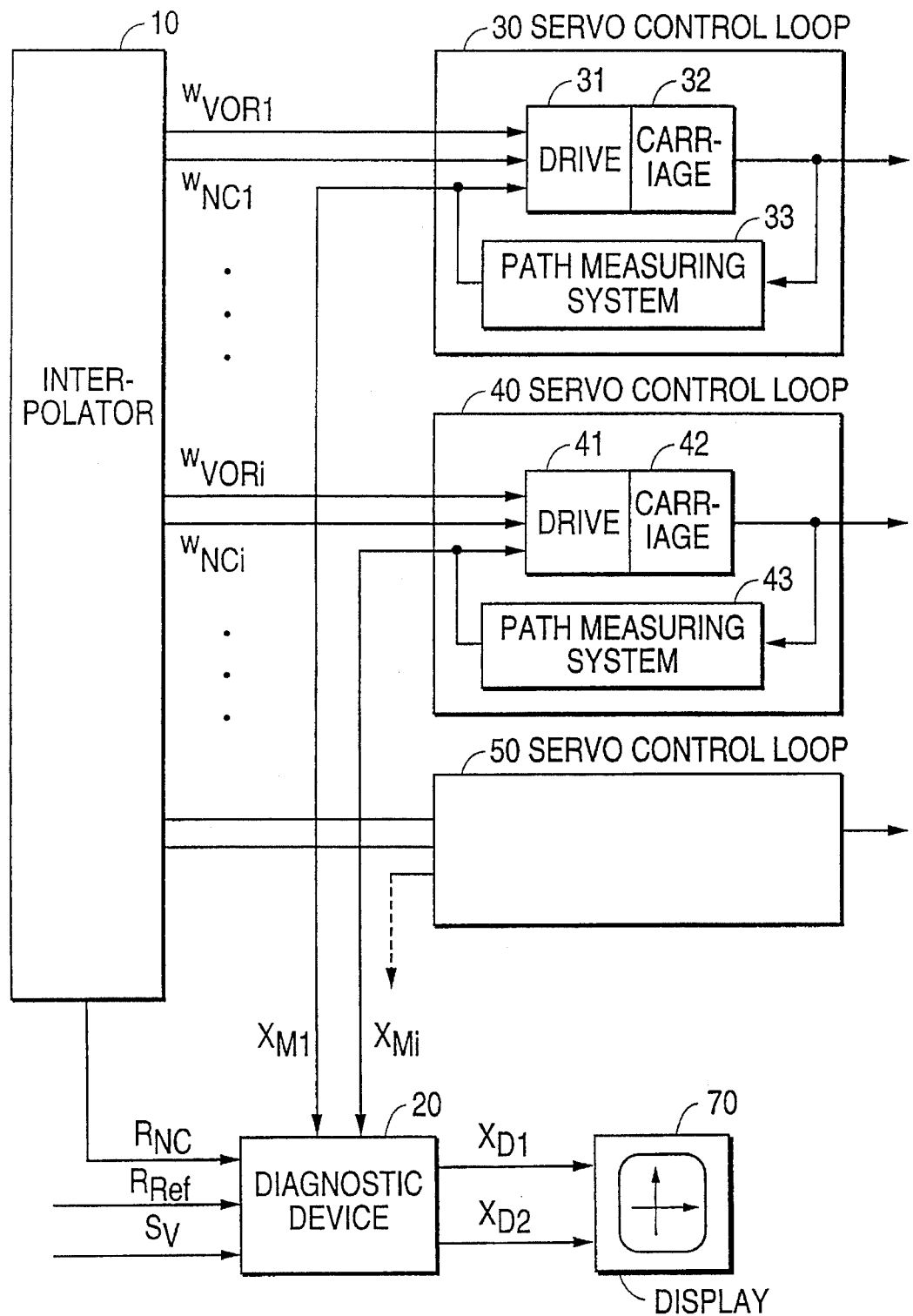
FIG. 2 is a block circuit diagram of the method according to the invention.

FIG. 2 is a simplified illustration of an arrangement for implementing the method according to the invention. It shows a portion of the control of a multi-axial NC machine which is not further illustrated. However, the proposed method is basically suitable for all types of machines and also, for example, for robots. The control is a conventional control whose configuration and function are known. FIG. 2 thus only shows those elements of the entire control that are required for describing the following specification.

An interpolator 10 generates, in accordance with the definition and in a prior art manner, intermediate supporting positions in addition to the supporting points coming from a processor for a desired movement path. The output signal of the interpolator 10 is a vectorial reference value $\vec{w}_{NC}$ for guiding at least two carriages of the machine along a desired circular path of movement $R_{NC}$. The components of the reference value $\vec{w}_{NC}$ are positioning reference signals $w_{NC1}$, $w_{NC2}, \ldots, w_{NCi}, \ldots$ for servo control loops 30, 40, 50 connected to the output and for controlling the individual axis.

The interpolator 10 is further provided with a pre-control device which is not further illustrated. This control device forms position reference signals $w_{NC1}$, $w_{NC2}, \ldots, w_{Nci}, \ldots$ in addition to the pre-control signals $w_{vor1}$, $w_{vor2}, \ldots, w_{vori}, \ldots$ which are also connected to the servo-control loops 30, 40, 50, which are connected to the output and comprise position control devices and drive 31, 41, carriage 32, 42, and path measuring system 33, 43. Advisably, at least the first and the second time deviation, i.e., reference speed and reference acceleration, of the positioning reference signal $w_{NC1}$, $w_{NC2}, \ldots, w_{NCi}, \ldots$ emitted by the interpolator 10 are pre-controlled. Although a pre-control device is not absolutely necessary, it improves significantly the results obtained with the circular-form test. An illustration of the principle of the pre-control is found, for example, in the paper, P. Stoph, "Verminderung dynamischer Bahnabweichungen in numerisch bahngesteuerten Werkzeugmaschinen, [Decrease in Dynamic Path Deviations in Numerically Controlled Paths of Machining Tools], Zeitschrift für industrielle Fertigung [Journal for Industrial Assembly], 1978, Pages 329 to 333. A method by which so-called pre-control parameters required for implementing the pre-control may be obtained is known from German Application, reference file P 40 39 620.7.

Connected to the output of the interpolator 10 are servo-control loops 30, 40, 50, corresponding to the number of axes on the machine under consideration, but at least two. Only three are illustrated in FIG. 2 for reasons of clarity, but more than three may be present also. All servo-control loops 30, 40, 50 are, in principle, similarly constructed, and each comprises a positioning control device and an axis actuator 31, 41, which, according to the positioning reference signal, predetermined by the interpolator 10, controls a carrier 32, 42 along an axis which is generally linear. The actual positions $x_{M1}, x_{M2}, \ldots, x_{Mi}, \ldots$ lying on an actual path $R_M$ of carriers 32, 42 with respect to a machine-fixed reference point are recorded by a path measuring system 33, 43 and are returned to the positioning control device by the axis actuator 31, 41. The path measuring systems 33, 43 are advisably measuring rulers for a direct measurement of lengths which are orthogonally arranged with respect to one another and are optically scanned. Path measuring systems of this type and their function are described, for example, in the journal "Konstruktion," 43, 1991, Page 401 to 410.

At least two of the positioning control devices or axis actuators 31, 41 influence axes orthogonal to one another and defining a plane. Based on at least two of the movements caused by a the positioning control device or axis actuators 31, 41, the associated carriers 32, 42 are moved along the respective axis in such a way that their relative movement corresponds to the desired path $R_{NC}$ predetermined by interpolator 10 as reference value $\vec{w}_{NC}$. It is irrelevant which carriers 32, 42 are moved. The movement of the carriers 32, 42 may also be regulated by more than one axis actuator, respectively, and along more than three axes. What is important is the relative movement of carriers 32 and 42 with respect to one another.

The carrier positions $x_{M1}, x_{M2}, \ldots, x_{Mi}, \ldots$ recorded by the path measruing system 33, 43 continue to be fed to a diagnostic unit 20. This diagnostic device 20 is additionally supplied by a signal from the desired circular path $R_{NC}$, which is determined by the reference value signal $\vec{w}_{NC}$, a reference signal $R_{Ref}$, and a scaling $S_v$ signal The output signal of the diagnostic unit 20, which advisably comprises two orthogonal information paths $x_{D1}, x_{D2}$, is fed to a display unit 70, preferably in the form of a screen.

Figure 1:
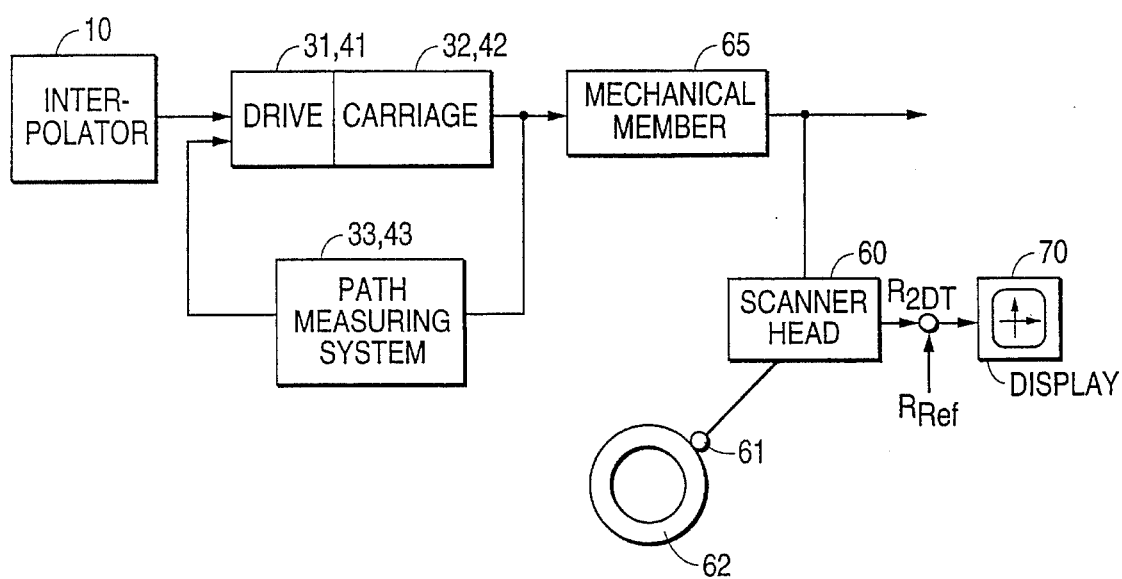
FIG. 1 is a block circuit diagram of a known circular form test.

FIG. 1 shows a prior art measuring arrangement including a circular normal and scanner as disclosed, for example, in the Knapp/Hrovat paper. Elements described by way of FIG. 2 are denoted by the same reference numerals. In addition to a path measuring system 33, 43, the arrangement according to FIG. 1 is particularly provided with a 2-D scanner, comprising essentially a scanner head 60 and a measuring tip 61, which are mechanically connected to one another. The 2-D scanner is mechanically connected with at least one of the carriers 32, 42. This is indicated by a mechanical member 65. While the measuring head 60 is moved in accordance with the desired circular path $R_{NC}$ which is predetermined by the control, the measuring tip 61 is guided along an annular measuring body 62 configured as a circular normal 62 and along a physical path defined by this body. With a view toward the subsequent evaluation of the measured results, distinction is made between scanning the inner side of the circular normal 62, the inner normal, and the outer side of the circular normal 62. The output signals $R_{2DT}$ of the 2D scanner are fed to a summing location 63 to which a reference signal $R_{Ref}$ may be additionally fed. The output signal of a summing position 63 may in turn be fed to a display unit 70 in the form of a display screen.

The function of the arrangements illustrated in the figures is further elucidated below, with FIG. 2 being considered first.

During the performance of the circular-form test, the interpolator 10 predetermines via a non-illustrated control a previously programmed desired circular path $R_{NC}$. It is advisable to select the desired circular path $R_{NC}$ such that it lies precisely in a plane defined by two axes, respectively. Consequently, during the execution of the desired circular path $R_{NC}$ by the machine, only the machine axes defining the circular plane are active, while the remaining axes are inactive. This type of machine-matched process later facilitates evaluation of the results. The machine passes through the desired circular path $R_{NC}$ with constant speed along the path. The path measuring system 33, 43 records the path $R_M$, which is actually executed during the machine movement of carriers 32, 42 by recording each of the positions of the carriers 32, 42 involved in the movement. For an unequivocal determination of one position of the relative movement path of the carrier, the positions of the carriers require at least two servo control loops 30, 40, 50. If the executed actual path $R_M$ is not exactly in one plane with respect to the path measuring system 33, 43, the carrier positions of three servo control loops 30, 40, 50 must at least be known. All recorded positions of the actual path $R_M$ are transmitted to the diagnostic unit 20. For each of the desired positions determined by the positioning reference signal $\vec{w}_{NC}$, i.e., for each interpolation step of the interpolator 10, the diagnostic unit 20 subsequently determines the difference between the position of carrier 32 and 42 with respect to one another on the desired path $R_{NC}$ and the associated position on the actual path $R_M$ measured by path measuring system 33, 43. This difference determined in the diagnostic unit 20 already represents the result of the circular-form test in the form of a path deviation $\Delta R$, which is displayed on the display 70.

To simplify the interpretation of the obtained results, a predeterminable reference signal $R_{Ref}$ in the form of a circular reference path is subsequently advisably added or, in a second modification, subtracted from it. In this manner, a visual representation of the results, which are then also visible as circles, is obtained. The results of different circular-form tests are also comparable. If the path deviation $\Delta R$ found in the circular reference path $R_{Ref}$ is subtracted, an actual circular path $R_M$ which is too small, appears as a circle 71 which is too large on the display 70, while an actual path $R_M$ which is too small appears as a circle 72 that is too small. Thus, the necessary corrections C may be directly obtained from the display 70. This type of illustration corresponds to a circular-form test of the type illustrated in FIG. 1 with the scanning on the inner normal. If the path deviation $\Delta R$ obtained in the diagnostic unit 20 is added to the reference signal $R_{Ref}$, a circle which is too small appears too small 71 on the display 70 and a circle which is too large appears too large 72. In this case, the deviations F between desired and actual path are available on the display 70, with the illustration corresponding to a circular-form test according to FIG. 1 with scanning on the outer normal. For an interpretation and explanation of the results, attention is called again to the paper by Knapp/Hrovat mentioned earlier. The evaluation methods may also be applied to the circular-form test proposed here.

In order to facilitate reading, the representations on the display are advisably magnified by scaling the coordinate system on which the display is based by a predeterminable magnification ratio $S_v$; suitable magnification ratios in this case are on the order of magnitude of 1000.

The basic concept on which the method according to the invention is based is to use the information—which is available in the servo-control loop in any case—and relates to the actual position of the carrier and to the desired position, in order to perform the circular-form test. However, one problem with this apparently obvious method is to associate correctly the desired positions and the actual positions measured by the direct path measuring system 33, 43, which are predetermined by the NC-Interpolator 10 and the actual positions to form a circular deviation. Due to the contour deviation, which occurs at different degrees in any type of numerically controlled machine, and due, for example, to the design of the position control in the servo control loop as proportional control, etc., there is the general effect that the desired value, predetermined by the control, is ahead of the actual value attained by the machine. This in turn causes, in the case of a circular movement, the radius of the actual circle actually executed by the machine always to be smaller than the desired radius of the desired circle. The desired and actual path may therefore not be compared by simply evaluating the desired and actual positions which were obtained at the same point in time.

Figure 3:
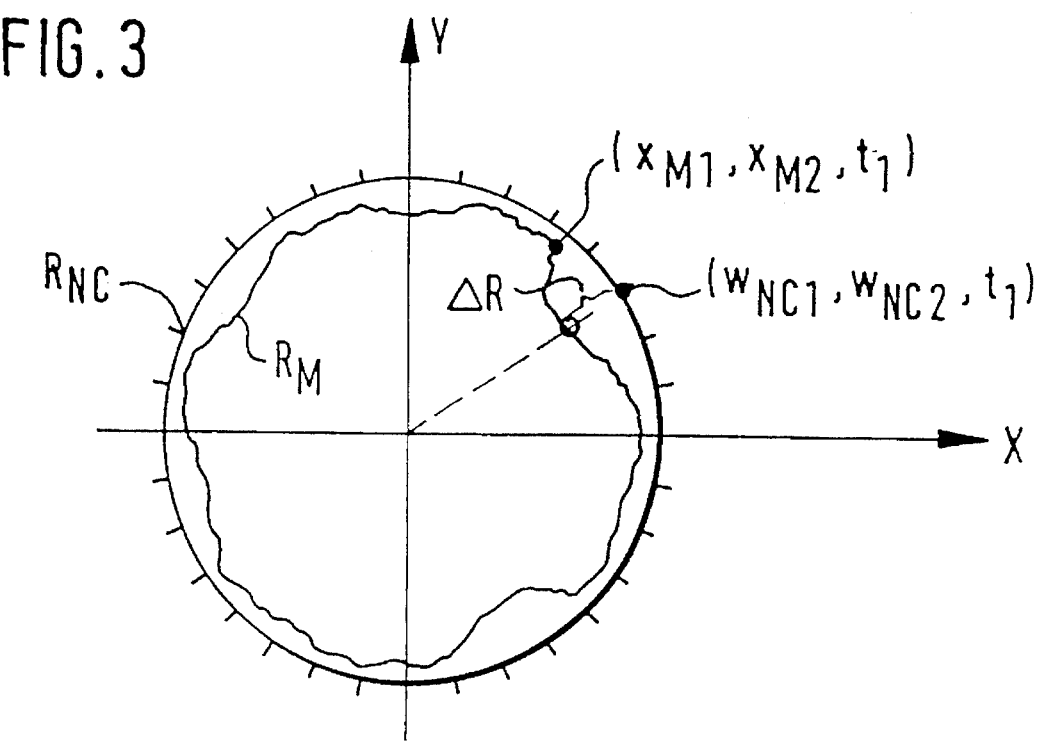
FIG. 3 is a graphic illustration of the results that may be obtained with the circular-form test.

The problem of association caused by the contour variation is illustrated in FIG. 3. $R_{NC}$ denotes the desired circular path which, due to the digital operation of the machine approximates a progression as a result of a sequence of desired positions, indicated in FIG. 3 by lines representing minutes. $R_M$ denotes the actual circular path recorded by the path measuring system 33, 43 and which, in the example in FIG. 3, is to be run through clockwise. It illustrates an x–y plane which is defined by any two desired orthogonal axes. At time $t_1$ the desired position $x_2$, $y_1$ is predetermined by the control. As a result of the contour deviation, the machine at the same time $t_1$ is actually at position $x_{M1}$, $Y_{M1}$.

FIG. 3 shows that a comparison of the desired and actual position at a fixed time $t_1$ could not furnish any information relating to the behavior of the machine, since the apparent path deviation $\Delta R$ does not coincide with the path deviation $\Delta R$ that is actually present.

The proposed method allows for the problem of coordinating machines whose controls include a pre-control device 12, to be circumvented. Since the object of the pre-control is to prevent contour variations, the desired and actual position in controls of this type generally coincide during a circular movement.

Although a pre-control can also significantly reduce the contour variation which is due to dynamics, it can never reduce it ideally to zero. Moreover, applications are conceivable for which pre-control is not possible or not desired.

Figure 4:
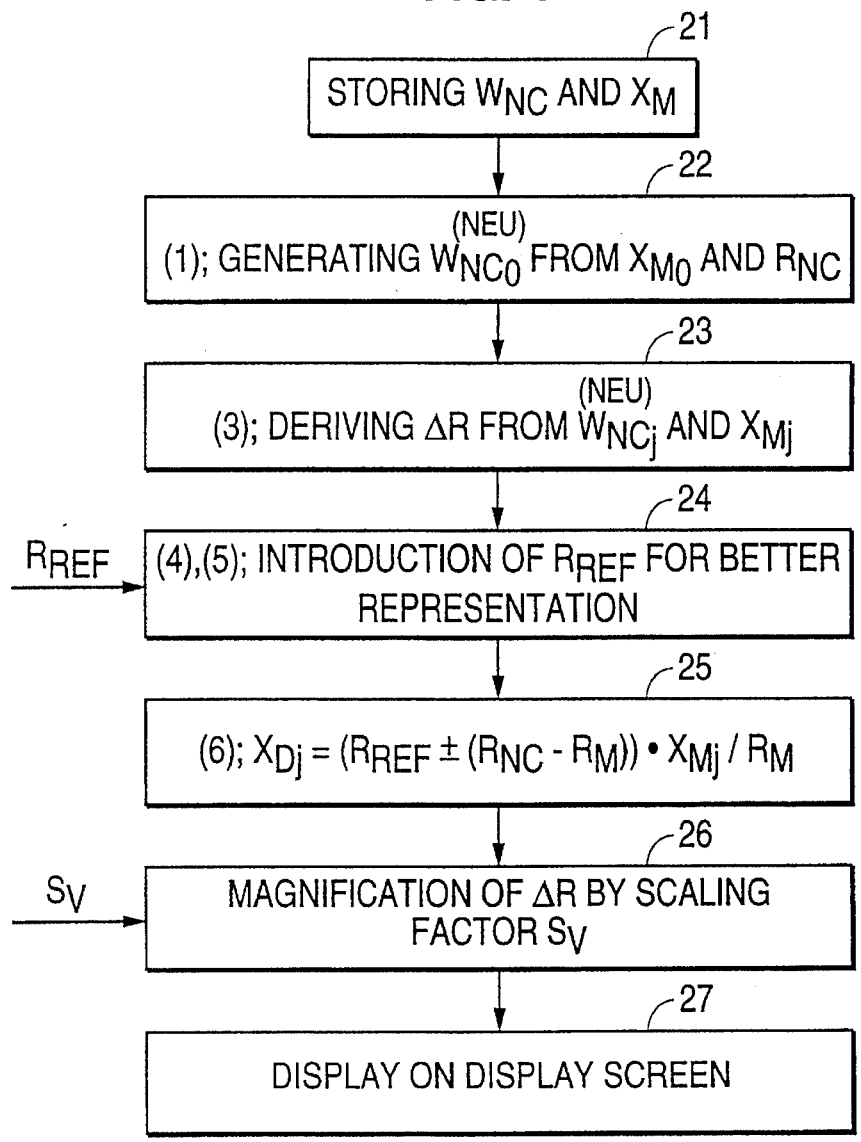
FIG. 4 is the structure of a method for performing the proposed circular-form test.
Figure 5:
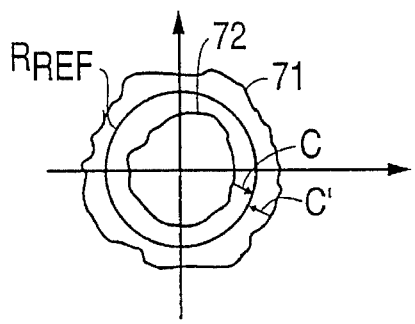
FIG. 5 shows a representation of the inner normal of a path deviation.
Figure 6:
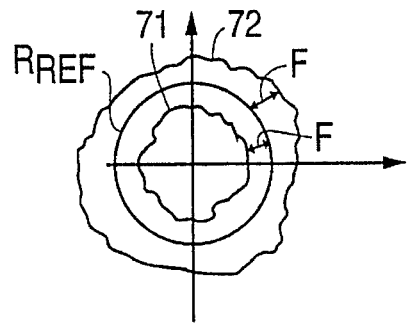
FIG. 6 is the representation of an outer normal.

Another possibility for solving the coordination problem is thus to perform the proposed circular-form test initially without corrections, but to evaluate the obtained results by evaluating the contour deviation later mathematically. This type of method is illustrated in FIG. 4. First, step 21, the NC machine moves through a predetermined desired circular path $R_{NC}$. Desired positions $w_{NC}$ and measured actual positions $x_M$ are stored axis by axis, with desired positions $w_{NC}$ and measured actual positions $x_M$ being recorded at the same times, respectively.

From the position values stored in the first step 21, newly corrected desired position values $w_{NC}$ are associated with the actual positions $x_M$ in step 22 for two axes j defining a Cartesian coordination system in the following manner:

$$w_{NCj}^{(new)} = R_{NC}/(x_{M1}^2 + x_{M1}^2)^{1/2} x_{Mj}; j = 1,2 \quad (1)$$

The association is appropriate, because the points on the desired path $R_{NC}$ between the positions given in FIG. 3 as minute lines represent exact desired values.

With the circular deviation $\Delta R = R_{NC} - R_M$, in which $$R_M = (x_{M1}^2 + x_{M2}^2)^{1/2} \quad (2)$$

expediently displayed on the display 70, the new desired position values $\vec{w}^{(new)}_{NC}$ yield in the next step 23, path deviation R for each actual position occurring at a time $t_1$ in the NC machine and which is as follows:

$$R = \left( \left( w_{NC1}^{(new)} - x_{M1} \right)^2 + \left( w_{NC2}^{(new)} - x_{M2} \right)^2 \right)^{1/2} \quad (3)$$

For a better representation of the results, the path deviation obtained according to equation 3 is in turn advisably added or subtracted to a reference signal $R_{Ref}$ in the form of a reference circle. This is why in step 24, for example, by way of an interactive input, the reference signal $R_{Ref}$ and the desired representation in the inner outer normal are determined. The axis components required on the display 70 for the point-by-point representation with respect to a Cartesian coordination system are thus calculated as follows:

$$x_{Dj} = (R_{Ref}/R_{NC}) \cdot w_{NCj}^{(new)} \pm \left( w_{NC}^{(new)} - x_{Mj} \right) \quad (4)$$

In this case, the minus sign corresponding to the inner normal and the plus sign to the outer normal.

In subsequent step 25, the magnification of the obtained path deviations $\Delta R$ occurs. This is the result of determining $S_v$, again, for example, interactively, for scaling the coordination system on which the subsequent display on the display screen 70 is based, step 27. Path deviation $\Delta R$ is subsequently represented on display 70 by way of axis components determined in accordance with equations (3) and or (4) and in the following manner:

$$R = (x_{D1}^2 + x_{D2}^2)^{1/2} = (R_{Ref} \pm R_{NC} - R_M) \quad (5)$$

Advisably, steps 21 to 24 are combined. Equations (1), (2), and (4) yield:

$$x_{Dj} = (R_{Ref} \pm (R_{NC} - R_M)) \cdot x_{Mj}/R_M \quad (6)$$

In this case, $X_{Mj}$ is measured, $R_M$ is calculated in accordance with equation (2) and $R_{Ref}$ and $R_{NC}$ is predetermined. The minus sign in turn applies to the inner normal, and the plus sign to the outer normal.

The entire diagnostic method is effected in diagnostic device 20, which may be realized both in the numeric control itself or in an external device.

On account of the proposed circular-form test, the performance accuracy of the servo control loops themselves is tested with the help of the path measuring system which is present in any case. Imprecisions related to mechanics and caused by the external mechanism of the machine, for example, a tool holder, are not recorded.

In cases in which there is an additional interest in the influence of the mechanism 65 disposed on the outside of the servo control loop 30, 40, 50 on the performance accuracy of the machine, it is advisable to carry out the circular-form test proposed in the invention in combination with a prior art method for a circular-form test, for example, according to Knapp/Hrovat. The latter includes the external mechanism 65 as shown in FIG. 1. A simple comparison of both testing methods thus allows information to be obtained regarding the external mechanism. Advisably, both circular-form testing methods are carried out successively, and for purposes of an example, it is assumed that first a test according to the method of the invention is performed. For the second method, the 2-D measuring scanner is fastened to a carrier, usually on the spindle. Subsequently, the machine in turn performs the same programmed circular path movement $R_{NC}$ that it already performed earlier within the Scope of the circular-form test according to the invention. The circular path $R_{NC}$ corresponds to the outer contour of the circular normal 62. During the movement of the machine, the measuring scanner 61 contacts the outer contour and thus moves on a circular path defined by the circular normal 62. During the movement of the machine, the 2-D scanner records the relative movements between scanner head 60 and measuring scanner 61 and converts them into an output signal. Since the scanner head 60 is guided along the actual path and the measuring scanner 61 along the desired circular path of the circular normal 62, this output signal corresponds to the circular deviation $\Delta R$. $\Delta R$ in turn is expediently displayed on the screen 70. For an improved understanding, a reference signal $R_{Ref}$ in the form of a circular reference path may be added or subtracted to the signal $\Delta R$, as proposed earlier in the specification of the circular-form test according to the invention.

The operation of the diagnostic unit 20 is advisably performed by means of a diagnostic menu realized in the form of software. The menu allows particularly to adjust new desired radii, for example, $R_{NC}$, or other reference radii, for example, $R_{Ref}$, or other magnification factors as well as to change the direction of rotation of the circular movement and to predetermine the speeds of circular paths. The evaluation of the results obtained with the circular-form test is further advantageously realized in accordance with software in the diagnostic unit. For example, circular form deviation, circular deviation, diameter deviation, and the width of backlash may be evaluated.

What is claimed is:

1. A method for verifying the performance accuracy of an NC machine, for a machine having at least two servo control loops each of which has an axis actuator for guiding a carrier in accordance with position reference signals from an interpolator corresponding to a desired movement path, and having a path measuring system which records and indicates an actual position of the carrier by position signals, comprising comparing a stored desired circular movement path with an actual circular path corresponding to the actual movement of the carrier by comparing each of the position signals provided by the path measuring system with an associated position reference signal, the method further comprising:

precontrolling the position reference signals for the servo control loops with respect to speed; and forming the actual circular path using the position signals supplied by the path measuring system.

2. A method according to claim 1, further comprising precontrolling the position reference signals from the interpolator for the servo control loops with respect to acceleration.

3. A method according to claim 1, further comprising:

subtracting the position signals of the path measuring system from the position reference signals of the interpolator to form result signals, subsequently subtracting the result signals from reference circular path signals to form display signals, and transmitting the display signals to a display device for display.

4. A method according to claim 1, further comprising:

subtracting the position signals of the path measuring system from the position reference signals of the interpolator to form result signals, subsequently adding the result signals to reference circular path signals to form display signals, and transmitting the display signals to a display device for display.

5. A method according to claim 3, wherein the reference circular path signals represent a circular path with a predeterminable radius.

6. A method for verifying the performance accuracy of a numerically controlled machine, for a machine having a movable member guided by an actuator in accordance with desired position signals from an interpolator, and having a measuring system which outputs actual position signals regarding the actual position of the movable member, the method for comparing a desired path with an actual path of the movable member with contour deviation between desired position signals and actual position signals taken into account, the method comprising:

forming a speed precontrol signal in the interpolator by simple time derivation of the desired position signal;

providing the speed precontrol signal to the actuator; and comparing each actual position signal with an associated desired position signal.

7. The method according to claim 6, further comprising:

forming an acceleration precontrol signal in the interpolator by simple time derivation of the speed precontrol signal; and providing the acceleration precontrol signal, along with the speed precontrol signal, to the actuator.

8. A method for verifying the performance accuracy of a numerically controlled machine, for a machine having a movable member guided by an actuator in accordance with desired position signals from an interpolator, and having a measuring system which outputs actual position signals regarding the actual position of the movable member, the method for comparing a desired path with an actual path of the movable member, the method comprising:

storing the desired position signals of the interpolator and respective actual position signals from the measuring system associated with the same respective points in time;

determining corrected desired position signal values using the stored actual position signals and radii signals of a reference circular path;

deriving a path deviation using the corrected desired position signal values and the stored actual position signals; and representing the derived path deviation on a display unit.

9. The method according to claim 8, further comprising precontrolling the desired position signals with respect to speed.

10. The method according to claim 8, further comprising precontrolling the desired position signals with respect to speed and acceleration.

* * * * *